Patented Apr. 28, 1942

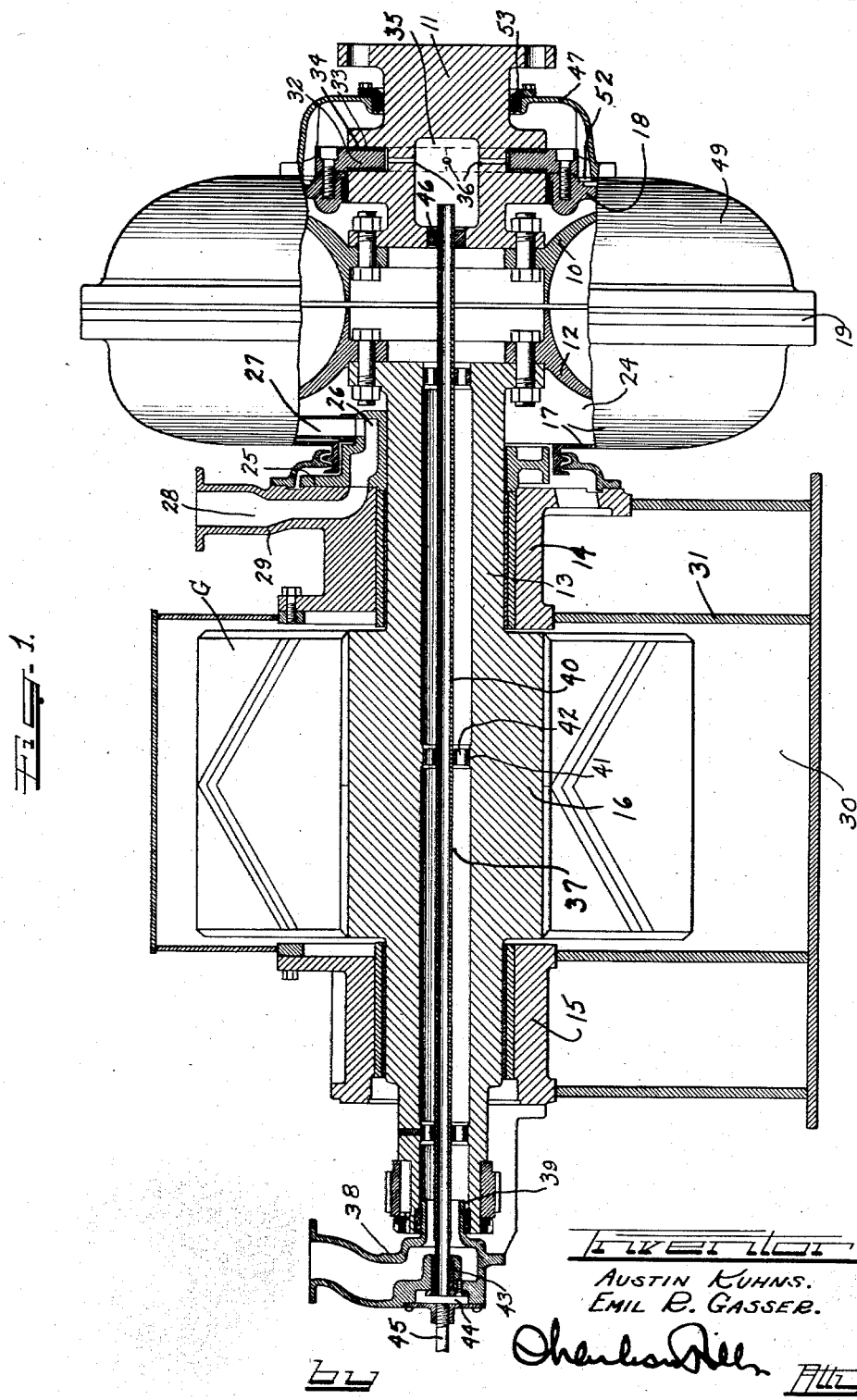

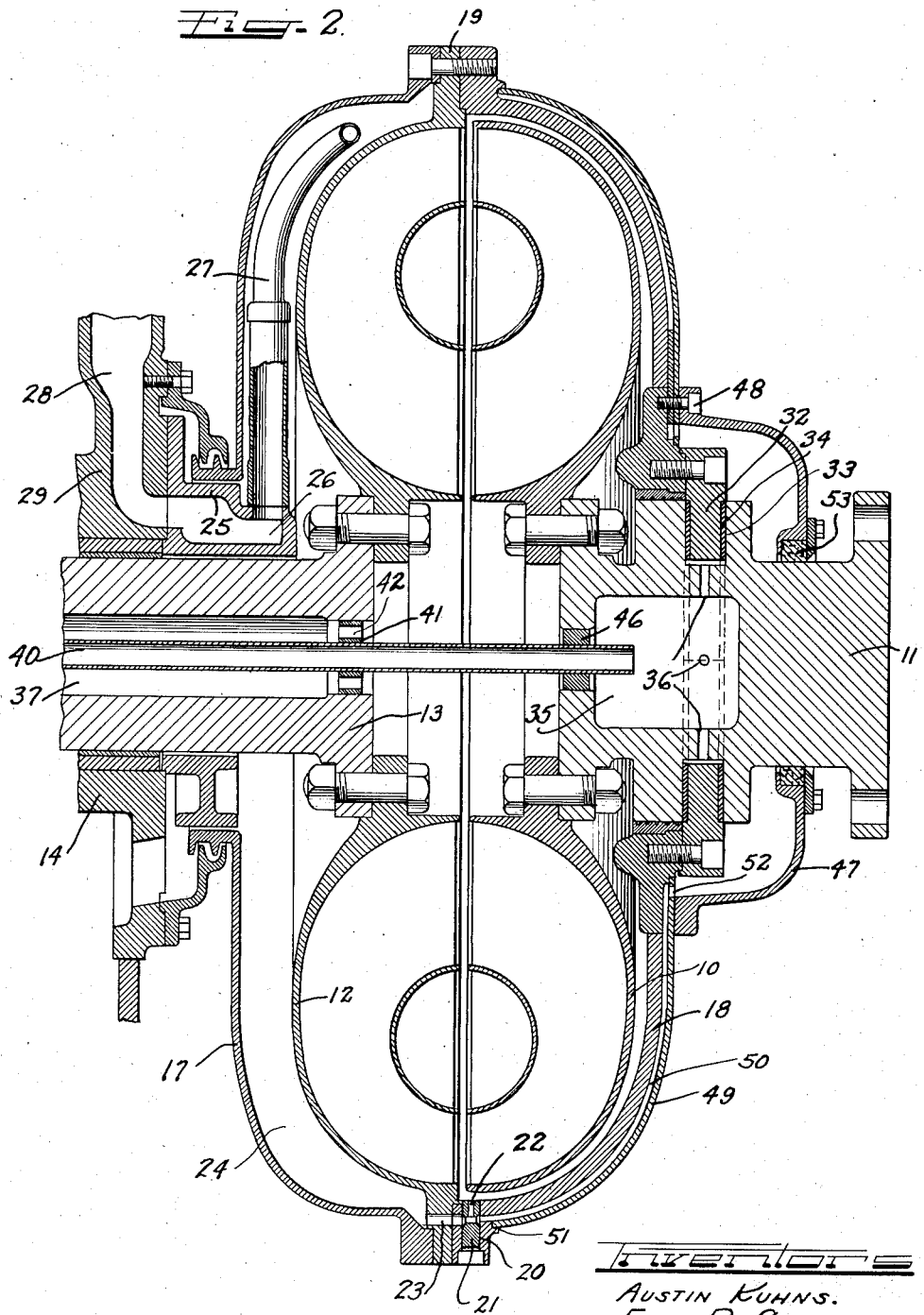

UNITED STATES PATENT OFFICE 2,281,161

HYDRAULIC CLUTCH THRUST BEARING LUBRICATION AND DRAINAGE

Austin Kuhns and Emil R. Gasser, Buffalo, N. Y., assignors to Farrel-Birmingham Company, Incorporated, Buffalo, N. Y., a corporation of Connecticut Application January 24, 1941, Serial No. 375,774

4 Claims. (Cl. 60—54)

This invention relates to thrust bearings for hydraulic clutches and particularly to lubrication and drainage thereof.

In hydraulic clutches, thrust bearing structure is usually provided between the impeller element driving shaft and the runner element to hold these elements in proper axial relationship and to prevent axial separation thereof by the pressure of the hydraulic fluid during operation of the clutch. In some installations, a housing surrounds the clutch and supports a bearing for the driving shaft adjacent to a thrust bearing, and both bearings drain into the housing. However, it may be desirable to eliminate the housing and the shaft bearing thereon and the important object of our invention is to provide for lubrication and proper drainage of the thrust bearing where the housing and the driving shaft bearings are eliminated.

In accordance with our invention, we provide a lubricating oil chamber in the impeller driving shaft from which oil is fed by centrifugal force to the surfaces of the thrust bearing, the oil being supplied to the oil chamber through a pipe extending axially through the clutch, and the drainage from the bearing is directed into the clutch from where it may be withdrawn by a scoop tube for return into the clutch oil system.

The various features of our invention are incorporated in the structure shown on the drawings, in which drawings:

Figure 1 is a side elevation, partly in section of a hydraulic clutch and a driving and driven shaft connected therewith, and showing the means for lubricating and draining the thrust bearing; and Figure 2 is an enlarged sectional view of the clutch and the shaft, clearly showing the means for lubricating and draining the thrust bearing.

The hydraulic clutch or coupling shown comprises the driving or impeller member 10 bolted to a shaft 11 which is adapted for connection with a driving source (not shown) such as a Diesel engine or electric motor. The driven or runner element 12 is bolted to the inner end of a shaft 13 which is in axial alignment with the driving shaft 11 and is journaled in bearing structures 14 and 15 and between these bearings supports a driving pinion 16 which may mesh with a gear G for driving a propulsion element such as the propeller in marine craft.

Surrounding the runner element is a casing comprising the part 17 and the part 18 which are secured at their peripheries to the peripheral flange 19 on the runner element 12 for rotation therewith. Extending through the peripheral portion of the casing part 18 is a passageway 20 containing a leak-off nozzle 21 whose port 22 connects the working space of the clutch with the passageway 23 through the flange of the runner element for leakage flow from the working space into the space 24 between the runner element and the inner casing part 17.

Secured to the bearing structure 14 is a frame 25 having a passageway 26 therein from which a scoop tube 27 extends into the space 24, the outer end of the passageway 26 communicating with the passageway 28 in the extension 29 on the bearing structure 14. During operation of the clutch, the fluid leaking from the hydraulic working space into the chamber 24 is scooped up by the tube 27 for return through outlet passageway 28 into the reservoir 30 formed in the bottom of the housing 31 which surrounds the pinion 16 and the gear G driven thereby and from which reservoir the oil is pumped back into the clutch, in a manner well known in the art.

The thrust bearing shown for neutralizing the coupling thrust within the coupling structure comprises a split thrust collar 32 bolted to the casing part 18 of the runner element and extending into the bearing channel 33 in the shaft 11 which supports the impeller element. This collar has suitably prepared bearing facings 34 engaging the sides of the channel 33 and provides bearing or rubbing area of sufficient extent to safely absorb the thrust load. This coupling engagement of the ring with the shaft 11 locks the two rotating members of the coupling in an axial direction to maintain proper axial relationship thereof but leaves the two coupling members free rotationally. The inner diameter of the coupling ring is preferably sufficiently less than the inner diameter of the bearing channel 33 so that the axes of the supporting shaft for the coupling element need not necessarily be in axial alignment.

For providing adequate lubrication for the thrust bearing, an oil chamber 35 is provided in the shaft 11 from which lubricating oil is distributed to the bearing face of the couplings through ports 36 extending from the chamber to the channel 33, the oil being then forced by centrifugal action to the bearing faces.

The pinion shaft 13 has the axial bore 37 therethrough communicating at its inner end with the hydraulic working space in the coupling. At the outer end of the pinion shaft, an oil inlet frame 38 is stationarily secured to the bearing or housing structure for the shaft and has a nozzle 39 projecting into the end of the shaft bore. By suitable pumping arrangement, oil is pumped from the reservoir 30 to the inlet frame 38 for delivery of the oil through the shaft bore to the coupling.

Extending through the shaft bore 37 is a pipe 40 which is secured to rotate with the shaft as by means of cross wall members 41 securely seated in the bore 37, these cross wall members having the passageways 42 therethrough for flow of the fluid from the inlet frame 38 to the coupling working space. At its outer end, the pipe 40 extends through a stuffing box 43 on the frame 38 and terminates in a chamber 44 into which lubricating oil may be charged through a pipe 45, and this pipe may be connected to have lubricating fluid applied thereto from the reservoir 30.

The inner end of the pipe 40 extends through a bearing bushing 46 in the shaft 11 and terminates in the oil chamber 35, so that this chamber is kept supplied with an adequate quantity of lubricating oil for discharge to the bearing faces of the thrust bearing.

In prior hydraulic clutch driving assemblies, a bearing was provided outside of the coupling for the driving shaft and the lubricant drainage from such bearing and also from a thrust bearing was discharged into a stationary casing surrounding the coupling. An important feature of our invention is the elimination of such shaft bearing and the stationary drainage receiving housing, by draining the thrust bearing into the scoop tube chamber of the coupling for return of the drainage to the reservoir 30. To accomplish this, a bell-shaped cover 47 receives the shaft 11 to surround the thrust bearing and is secured, as by screws 48, to the outer housing part 18 on the coupling runner element. A secondary casing part or shroud 49 surrounds the main casing part 18 parallel therewith but spaced a distance away therefrom to provide passageway 50. At its inner periphery, this shroud is clamped between the cover 47 and the casing part 18 with its outer periphery jointed to the outer periphery of the casing part 18 as indicated at 51. The passageway 50 communicates with the passage 20 through which the leak-off nozzle 21 extends, and when this nozzle is open the passage 50 will be in communication with the scoop tube chamber 24. At its inner periphery, the shroud has openings 52 communicating with the interior of the cover 47. During operation of the coupling, the oil discharged from the thrust bearing will be received in the cover 47 for discharge therefrom through the passageway 50 into the scoop tube chamber 24 from where the scoop tube takes it up for return to the reservoir 30. Suitable packing arrangement 53 may be provided between the cover 47 and the shaft 11 to prevent leakage.

We have thus produced a simple, compact, and efficient thrust bearing arrangement in association with a hydraulic clutch and efficient means for keeping the bearing supplied with lubricating fluid, and simplified means for drainage of the bearing directly into the coupling housing. By the elimination of a shaft bearing and a stationary drainage housing, the cost of production and assembly is materially decreased.

We have shown a practical and efficient embodiment of our invention but do not desire to be limited to the exact construction, arrangement and operation shown and described as changes and modifications may be made without departing from the scope of the invention.

We claim as follows:

1. A hydraulic clutch assembly comprising an impeller element and a runner element, a driving shaft connected to the impeller element, a driven shaft connected to the runner element, a two-part casing secured at its periphery to the runner element to rotate therewith and to surround said impeller and runner elements, one part of said casing and said runner element defining a scoop tube chamber, a scoop tube mounted in said chamber, leakage passageways connecting the working space between said clutch elements with said scoop tube chamber, a thrust bearing between the second part of said casing and said driving shaft for neutralizing the axial thrust of the clutch elements, means for supplying lubricant to said bearing, and an auxiliary casing structure surrounding said second part of said casing and said bearing for receiving drainage lubricant from said bearing and having connection with said leak-off passageways for flow of the drainage lubricant into said scoop tube chamber.

2. A hydraulic coupling assembly comprising an impeller element and a runner element, a drive shaft connected with the impeller element, a driven shaft connected with the runner element in axial alignment with said driving shaft and having a bore therethrough communicating at its inner end with the working space between the coupling elements, means for charging hydraulic working fluid into the outer end of said bore, a casing for the coupling elements secured to the runner element to rotate therewith, a thrust bearing between said casing and said driving shaft, a lubricating oil chamber in said driving shaft and outlets therefrom to said thrust bearing, and a lubricating oil supply pipe for said chamber extending outwardly therefrom through the driven shaft bore and adapted at its outer end for connection with a lubricating oil supply.

3. A hydraulic coupling assembly comprising an impeller element and a runner element, a drive shaft connected with the impeller element, a driven shaft connected with the runner element in axial alignment with said driving shaft and having a bore therethrough communicating at its inner end with the working space between the coupling elements, means for charging hydraulic working fluid into the outer end of said bore, a casing for the coupling elements secured to the runner element to rotate therewith, a thrust bearing between said casing and said driving shaft, a lubricating oil chamber in said shaft and outlets therefrom to said thrust bearing, and a lubricating oil supply pipe for said chamber extending outwardly therefrom through the driven shaft bore and adapted at its outer end for connection with a lubricating oil supply, and means for returning the drainage oil from said thrust bearing to the interior of said casing.

4. A hydraulic coupling assembly comprising an impeller element structure and a runner element structure, axially aligned supporting shafts for said structures respectively, a thrust bearing between one of said shafts and the structure supported by the other shaft, said thrust bearing shaft having an axially extending chamber therein for lubricant and said shaft having passageways therethrough for flow of the lubricant from said chamber to said bearing, and means extending through said other shaft for supplying lubricant to said chamber.

AUSTIN KUHNS.
EMIL R. GASSER.